United States Patent [19]
Hadden

[11] Patent Number: 5,989,666
[45] Date of Patent: Nov. 23, 1999

[54] AESTHETIC STRUCTURE WITH SIMULATED LEADING

[75] Inventor: David M. Hadden, 241 N. Clark Ave., Los Altos, Calif. 94022

[73] Assignee: David M. Hadden, Los Altos, Calif.

[21] Appl. No.: 09/105,192

[22] Filed: Jun. 26, 1998

[51] Int. Cl.[6] .................................................. B32B 3/10
[52] U.S. Cl. ........................... 428/38; 428/43; 428/167; 428/189; 428/316.6; 52/311.1
[58] Field of Search .................. 428/38, 77, 189, 428/316.6, 43, 167; 52/311.1

[56] References Cited

U.S. PATENT DOCUMENTS

| | | | |
|---|---|---|---|
| 3,713,958 | 1/1973 | McCracken | 428/38 |
| 4,009,309 | 2/1977 | Holt | 428/38 |
| 4,302,260 | 11/1981 | Meltzer | 156/63 |
| 4,312,688 | 1/1982 | Brodis et al. | 428/38 |
| 4,837,060 | 6/1989 | Bambara et al. | 428/316.6 |
| 5,269,858 | 12/1993 | Silverman | 156/62 |
| 5,834,082 | 11/1998 | Day | 428/316.6 |
| 5,840,391 | 11/1998 | Eichhorn et al. | 428/38 |

*Primary Examiner*—Alexander Thomas
*Attorney, Agent, or Firm*—Flehr Hohbach Test Albritton & Herbert LLP

[57] ABSTRACT

An aesthetic structure comprising a sheet of material having a smooth surface and a plurality of strips of a non-metallic material. Each strip has a surface and a layer of adhesive material is adhered to the surface of each strip for securing the strip to the smooth surface of the sheet of material. The strips are disposed on the smooth surface of the sheet of material to segment the smooth surface of the sheet of material into discrete portions. A method for making an aesthetic structure such as a stained glass window is provided.

25 Claims, 4 Drawing Sheets

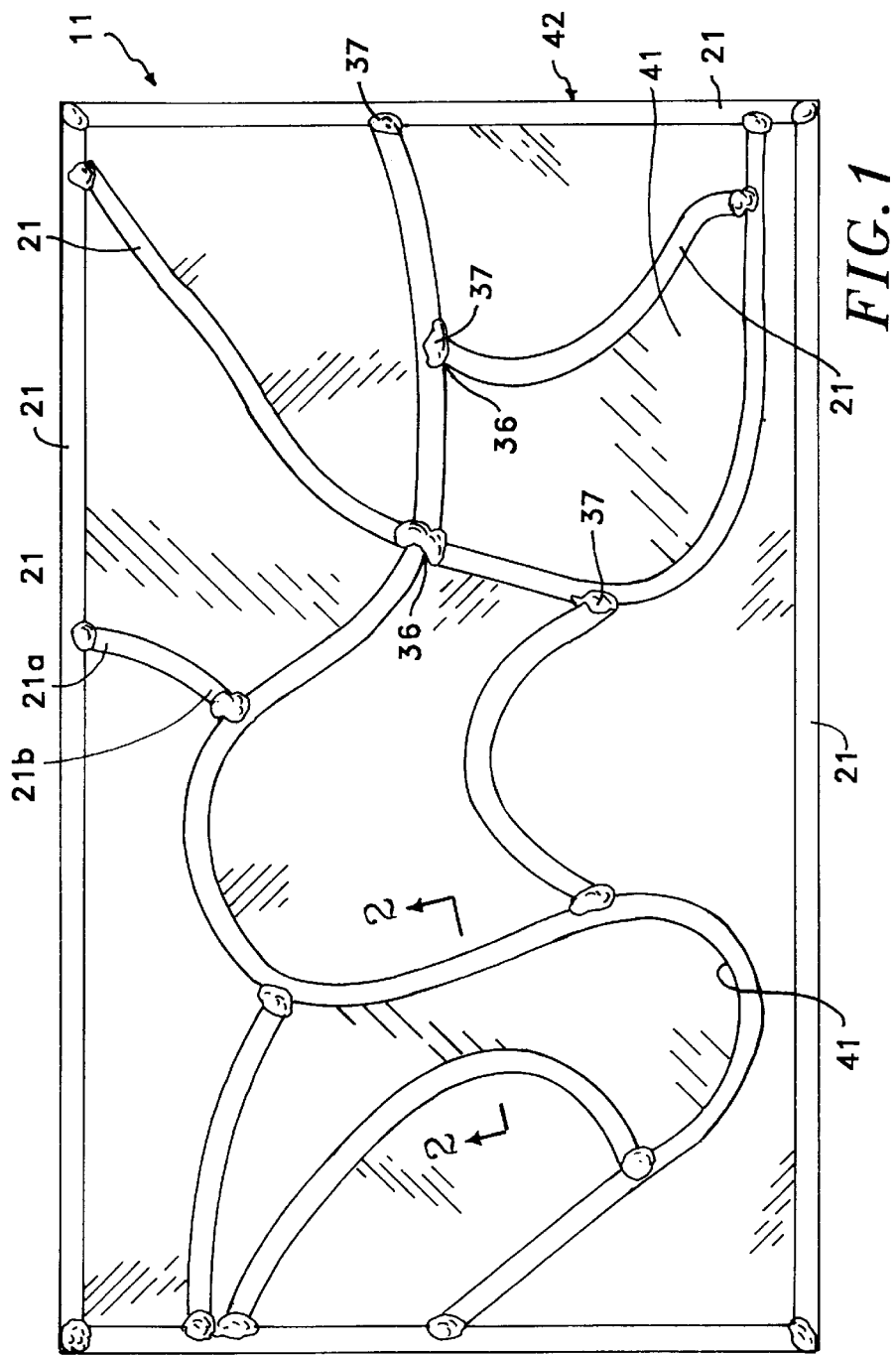
FIG.1
FIG.2

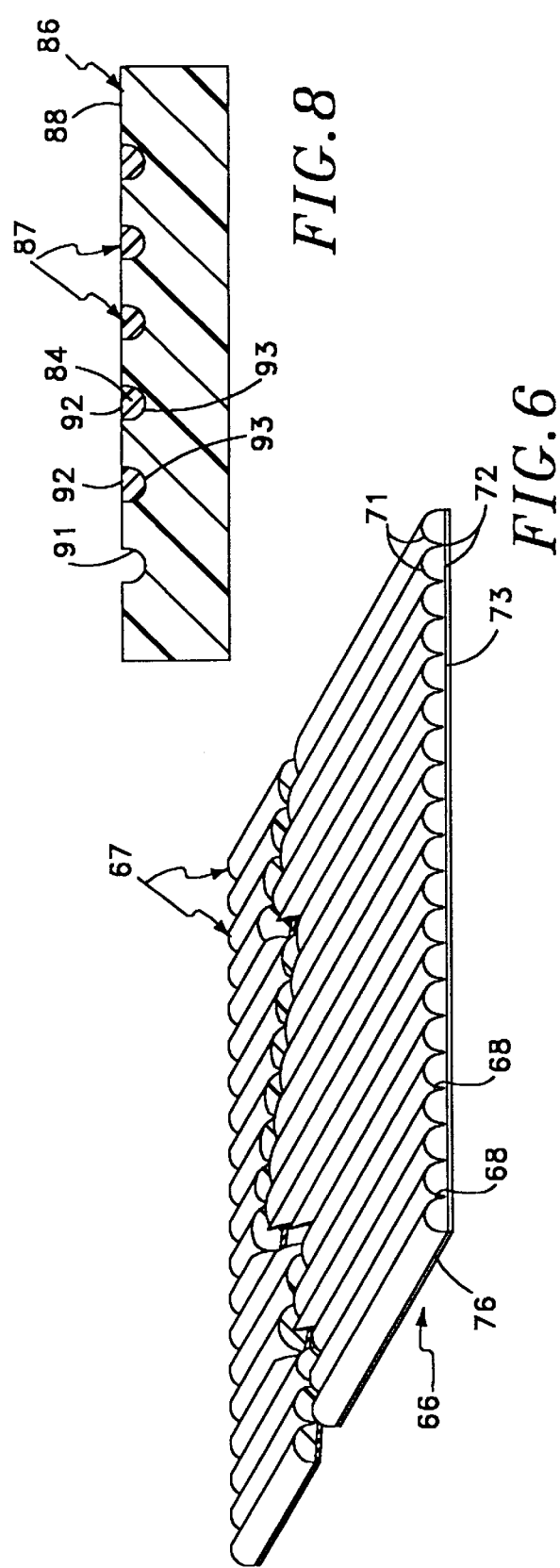
FIG. 6
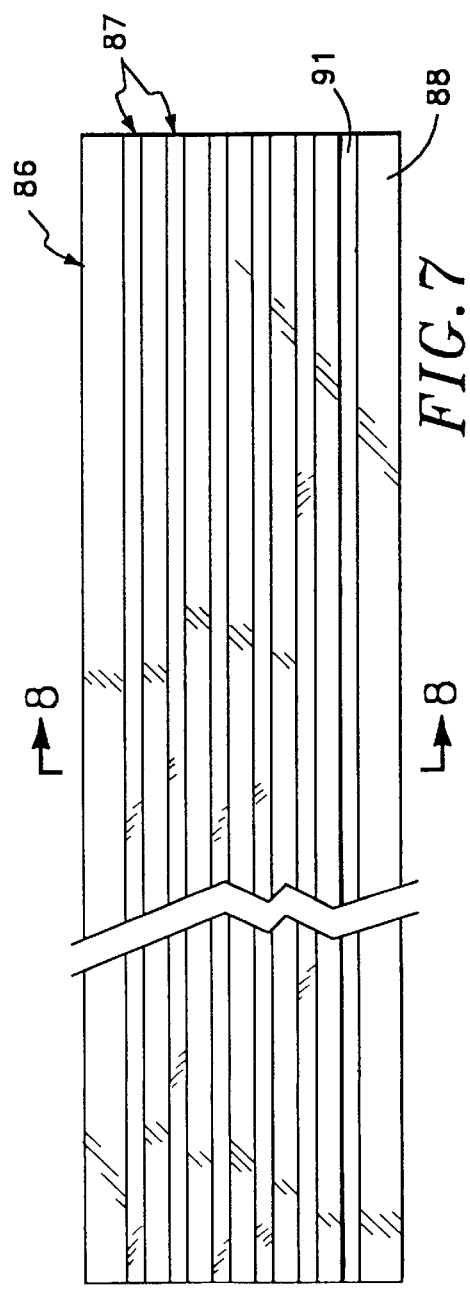
FIG. 8
FIG. 7

AESTHETIC STRUCTURE WITH SIMULATED LEADING

This invention relates generally to faux structures and more particularly to imitation leading for simulated stained glass and other windows.

A stained glass window is typically formed by shaped pieces of glass joined by strips of lead having grooves therein for receiving the side of the glass. The leaded strips are soldered together. Creating a stained glass window or similar structure is a difficult and time consuming process.

Several products are currently available for constructing simulated stained glass windows and similar structures from glass, plastic and the like. One such product consists of lead strips which can be cut to the desired length and secured to a glass or other surface by an adhesive backing. A peel strip is removed from the adhesive prior to attaching the lead strip to the surface. This product suffers from the disadvantage of being relatively expensive. In addition, the lead material can be difficult to reshape after initially bent and can be dangerous to work with.

Another method for simulating leading in a window consists of applying a bead of liquid plastic from a tube or other container to a desired glass or other surface. The plastic hardens and cures to create the appearance of a lead strip in the glass. Application of the liquid plastic to a vertical surface is made difficult by the effects of gravity and the fixed position of the vertical surface relative to the artisan. As a result, the liquid plastic is often first applied to a horizontal surface. The plastic strip formed by the cured liquid plastic is then peeled from the temporary surface and applied to the desired vertical surface. When applied shortly after curing, the residual stickiness of the plastic retains the plastic strip on the vertical surface. The glass segments bordered by the plastic strips are optionally painted to the desired color. Unfortunately, it is difficult to form such a plastic strip with a consistent or desired shape. Furthermore, it is difficult to maintain a constant flow rate and direction of flow of plastic from the container for creating a bead of uniform width. The resulting variations in height and width detract from the appearance of these imitation lead strips. In addition, the liquid plastic requires a considerable time to cure for permitting removal from the temporary surface or painting.

Other simulated stained glass window products include molded pieces of plastic which have been preformed to create a certain design. These products do not permit the artisan to create a custom design. Nor do they permit a preinstalled window, mirror or the like to be segmented in a customized manner with strips.

It is in general an object of the invention to provide a new and improved strip for application to a surface to create the appearance of a leaded framework.

Another object of the invention is to provide a strip of the above character which is formed from a non-metallic material.

Another object of the invention is to provide a strip of the above character which is inexpensive.

Another object of the invention is to provide a strip of the above character which is preformed prior to application to the surface.

Another object of the invention is to provide a strip of the above character which can be operated upon immediately following application to the surface.

Another object of the invention is to provide a strip of the above character which can be removed from the surface and replaced onto the surface during a convenient time period after initial placement.

These and other objects are achieved in accordance with the invention by providing an aesthetic structure comprising a sheet of material having a smooth surface and a plurality of strips of a non-metallic material. Each strip has a surface and a layer of adhesive material is adhered to the surface of each strip for securing the strip to the smooth surface of the sheet of material. The strips are disposed on the smooth surface of the sheet of material to segment the smooth surface of the sheet of material into discrete portions. A method for making an aesthetic structure such as a stained glass window is provided.

BRIEF DESCRIPTION OF THE DRAWINGS

FIG. 1 is a plan view of an aesthetic structure of the present invention.

FIG. 2 is a cross-sectional view of the aesthetic structure of FIG. 1 taken along the line 2—2 of FIG. 1.

FIG. 6 is an isometric view of yet another embodiment of a sheet of imitation leading strips for use in the aesthetic structure of the present invention.

FIG. 7 is a top plan view of a mold for creating another embodiment of the imitation leading strips of the present invention.

FIG. 8 is a cross-sectional view of the mold of FIG. 7 taken along the line 8—8 of FIG. 7.

Figure 3:
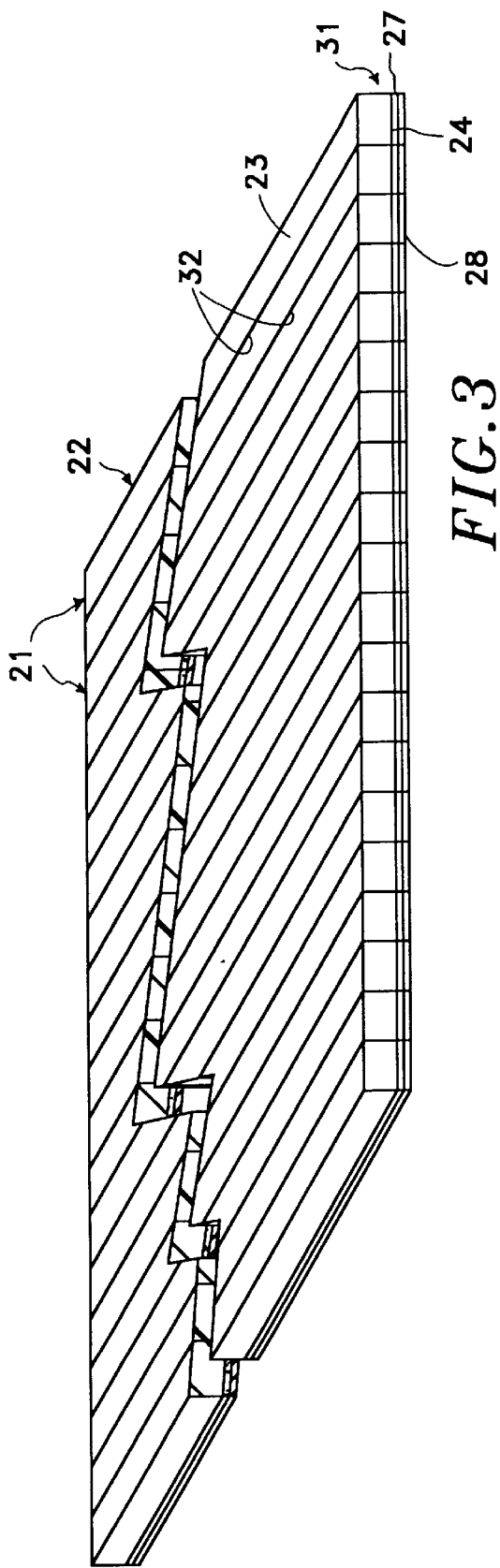
FIG. 3 is an isometric view of a sheet of imitation leading strips for use in the aesthetic structure of the present invention.

In general, the aesthetic structure of the present invention can be in the form of a simulated stained glass window 11 shown in FIG. 1. The simulated stained glass window 11 has as its support structure a sheet of material in the form of a conventional pane of glass 12 having first and second opposite planar, smooth surfaces 13 and 14. Each of surfaces 13 and 14 is at least partially reflecting.

A plurality of flexible strips 21 of a non-metallic material are applied to first surface 13 to simulate the leading strips in a stained glass window (see FIGS. 1 and 2). Flexible strips 21 each have first and second end portions 21a and 21b and are made from any suitable material, preferably a flexible material such as an elastomeric polymer or rubber. The flexible strips 21 are supplied from a sheet 22 made from an elastic polymeric material and having a first or upper surface 23 and an opposite second or lower surface 24. Although sheet 22 is flexible and pliable, surfaces 23 and 24 can be arranged as in FIG. 3 so as to each be planar and be parallel to each other. The material of sheet 22 can be any desired color. Preferably, the material of sheet 22 is pewter in color so that strips 21 resemble lead when placed on glass 12. A layer 27 of any suitable adhesive material is secured to lower surface 24 of the sheet 22. The adhesive layer 27 is preferably a laminating adhesive or adhesive transfer such as a solvent based acrylic adhesive, an emulsion based acrylic adhesive or a rubber based adhesive. Alternatively, however, the adhesive layer 27 can be a double coated laminating adhesive and be within the scope of the present invention. A paper backing sheet 28 is removably attached to adhesive layer 27 and serves as a base or substrate of the laminate 31 consisting of sheet 22, adhesive layer 27 and backing sheet 28.

Flexible strips 21 are formed in sheet 22 and adhesive layer 27 by making a plurality of parallel slits or cuts 32 in sheet 22 and adhesive layer 27 by any suitable means such as kiss cutting. Cuts 32 do not extend through backing sheet 28. The cuts 32 are spaced apart an approximate equal distance such that strips 21 are of equal thickness (see FIG. 3). Cuts 32 provide strip 21 with first and second parallel side surfaces 33. As such, strips 21 are disposed in juxtaposition on continuous backing sheet 28 and each strip 21 has a rectangular cross-section as shown in FIGS. 2 and 3. More specifically, flexible strips 21 have a width ranging from 0.050 to 0.375 inch and preferably approximately 0.125 inch and a thickness ranging from 0.010 to 0.063 inch and preferably approximately 0.040 inch. Sheet 22 and the strips 21 can be of any suitable length, for example twelve inches.

In the method of the present invention, flexible strips 21 are individually peeled from backing sheet 28 to expose adhesive layer 27 disposed on lower surface 24 of the strip. Each strip 21 is mounted on first smooth surface 13 of glass 12 by placing adhesive layer 27 disposed on lower surface 24 of the strip 21 against the surface 13 (see FIG. 2). The strip 21 is bent as necessary during its placement on glass 12 to create the desired shape with the strip and the desired design for simulated stained glass window 11. Adhesive layer 27 permits the artisan to reposition the strip 21 several times if necessary to achieve the desired positioning of the strip on the glass 12. However, after several days the adhesive bonding of layer 27 becomes substantially more secure, making it more difficult to reposition the strip 21. Although strip 21 can be cut to the desired length prior to being mounted on glass 12, the strip can also be cut after placement on the glass. Once strip 21 is properly positioned on the glass 12, the strip is pressed firmly against the glass 12 by the application of an appropriate force along upper surface 23 of the strip 21. Additional strips 21 are similarly peeled from backing sheet 28 and placed on glass surface 13 in a desired manner.

It is desirable that adhesive layer 27 have a high shear strength, that is to provide a high shear force between the rubber material of strip 21 and glass 12, for adhering the strip to the smooth surface 13 of the glass. Such a shear force is particularly important where a strip 21 has been bent from its normal straight shape, shown in FIG. 3, to a desired curved configuration, shown in FIG. 1. In this case, the shear force provided by adhesive layer 27 serves to retain the strip 21 in its curved or strained configuration.

End portions 21a and 21b of strip 21 placed on glass 12 typically meet or adjoin an end portion or other portion of another strip 21 mounted on the glass 12 at an intersection 36 (see FIG. 1). Although in many instances such adjoining strips may actually make physical contact with each other, the present invention does not require such contact and an end portion 21a or 21b of one strip 21 may merely be placed in close proximity to the portion of the adjoining strip 21. Such physical contact is particularly not necessary when simulated glass window 11 includes an imitation solder 37 at the intersection 36. Solder 37 can be formed from any suitable material and preferably is formed from a hardenable material which can be applied to any intersection 36 in a liquid form. A suitable material for solder 37 is a liquid plastic, preferably an acrylic material such as the Simulated Liquid Leading™ material sold by Plaid Enterprises located in Norcross, Ga., which has the appearance of a solder joint when cured.

The placement of imitation lead strips 21 on smooth surface 13 of glass 12 serve to segment the surface 13 into discrete portions or segments 41 bordered by the strips 21 (see FIG. 1). The pattern or configuration of segments 41 create the desire design in simulated stained glass window 11. Although the frame 42 for the simulated stained glass window 11 shown in FIG. 1 is formed from one or more imitation lead strips 21, it should be appreciated that frame 42 can be formed from wood or any other suitable material and be within the scope of the invention.

The method for forming simulated stained glass window 11 further includes applying a paint to at least one of segments 41 and as shown in FIG. 1 all of the segments 41. Paints are applied on first surface 13 and, as shown in FIG. 2, create a painted layer 43 over surface 13 which has the appearance of stained glass (see FIG. 2). Preferably, a plurality of different colored paints are utilized so that segments 41 differ in color and are used together to create the desired image of simulated stained glass window 11. It should be appreciated that more than one different colored paint can be applied to a segment 41. The paint applied to segments 41 is preferably semi-transparent so as to permit the passage of light through simulated stained glass window 11. It is preferable that painted layers 43 have a textured outer surface 44, as shown in FIGS. 1 and 2, so that each segment 41 more closely resembles stained glass.

Although the aesthetics structure of the present invention is shown in FIG. 1 and described above as being a simulated stained glass window 11, an aesthetic structure (not shown) substantially identical to simulated stained glass window 11 but not having a paint applied to some or all of segments 41 can be within the scope of the present invention. In such a structure, glass 12 would thus remain clear and imitation lead strips 21 serve to form a design on the glass 12. In a further embodiment of the invention, a sheet of plexiglass or another sheet of transparent, semi-transparent or opaque material can be utilized in place of glass sheet 12. In addition, a mirror having a reflective surface can be substituted for the sheet of glass 12 and imitation lead strips 21 applied to the reflective surface of the mirror. A painted layer 43 can optionally be applied to the segments formed by imitation lead strip 21 on the reflective surface of the mirror. As can be seen, the aesthetic structure of the present invention can include a variety of transparent materials, partially transparent materials and/or partially reflective materials in place of glass 12.

Figure 4:
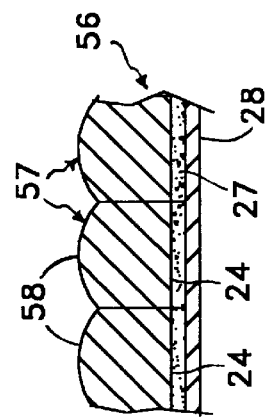
FIG. 4 is a cross-sectional view of another embodiment of the imitation leading strips of the present invention.

The imitation lead strips described herein can have other shapes and be within the scope of the present invention. For example, a portion of a laminate 56 substantially similar to laminate 31 is shown in FIG. 4. Like reference numerals have been used to describe like components of laminates 56 and 31. The laminate 56 includes a plurality of flexible strips 57 disposed in juxtaposition. Flexible strips or imitation lead strips 57 are substantially similar to flexible strips 21 except that upper surface 58 of each strip 57 has a convex arcuate shape so as to be arch-like in shape. In another embodiment, the imitation lead strips herein can be provided with individual backing strips of a material similar to the material of backing sheet 28 on the lower surfaces of the lead strips. Such imitation lead strips would thus not be supplied in sheet form.

Imitation lead strips such as strips such as strips 21 and 67 can be made from other materials and be within the scope of the present invention. For example, either of strips 21 or 67 can be made from a foam material or foamed plastic such as a polyurethane foam. Adhesive layers 27 and 73 can also be made from other materials not described above. For example, the adhesive layer in the strips can include a carrier layer having an adhesive on one or both sides thereof which is secured to the lower surface of the strip 27 or 73. A mylar membrane could serve as the material of the carrier layer.

Figure 5:
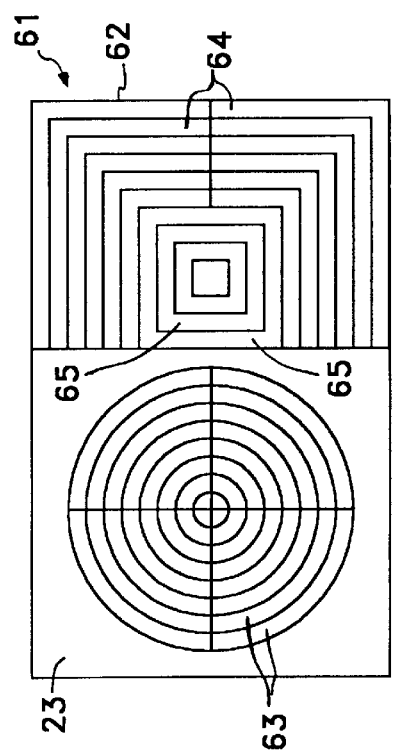
FIG. 5 is a plan view of a further embodiment of the imitation leading strips of the present invention.

The imitation leading strips of the present invention can be other than straight in shape. In this regard, a laminate 61 substantially identical in composition to laminate 31 is shown in plan in FIG. 5. Like reference numerals are used to describe like components of laminates 31 and 61. Sheet 62 and the underlying adhesive layer (not shown) of the laminate 61 are cut to provide a plurality of flexible strips 63 which are arcuate in shape, a plurality of flexible strips 64 which have the shape of an "L" and a plurality of flexible strips 65 which are square in shape. The preformed shapes of laminate 61 can be mounted on a surface such as surface 13 in the same manner described above with respect to strips 21 to create a desired design on the surface 13. A multitude of other shapes can be provided in laminate 31, such as, for example, circular-shaped strips, semicircular-shaped strips, C-shaped strips and triangular-shaped strips.

In another embodiment of the imitation lead strip of the present invention, an extruded sheet 66 is shown in FIG. 6 for creating a plurality of flexible strips or imitation lead strips 67. Continuous sheet 66 is extruded from any suitable flexible plastic material such as vinyl. Preferred vinyls have a Shore A durometer reading of 50 or less. The sheet 66 is formed with a plurality of transversely spaced-apart grooves 68 which, together with the weakened area in the sheet 66 formed thereby, separate one imitation lead strip 67 from another. The strips 67 each have a first or upper surface 71 which is semi-circular in shape and a second or lower surface 72 which is planar when flexible sheet 66 is in a planar disposition as shown in FIG. 6. An adhesive layer 73 made from an emulsion based acrylic adhesive, a solvent based acrylic adhesive or a rubber based adhesive or any other suitable material is disposed on lower surface 72 and a backing sheet 76 substantially similar to backing sheet 28 is removably secured to adhesive layer 73.

In operation in use, imitation lead strips 67 are peeled from backing sheets 76 for application to a surface such as first surface 13 of glass sheet 12 in the manner described above. Although grooves 68 do not extend through to lower surface 72, the grooves are sufficiently deep so that each imitation lead strip 67 can be separated from the adjoining strip 67 at the intervening groove 68. An imitation solder 37 can optionally be formed at the intersection of adjoining flexible strips 67 disposed on the surface of the sheet 12. In addition, a painted layer 43 can optionally be applied to the segments formed by imitation lead strips 67.

In other embodiments of the present invention, imitation lead strips can be formed from a liquid material and thereafter the material allowed to harden into a strip with a desired preformed shape. A particularly suitable material for the imitation lead strips is a curable plastic 84, preferably an acrylic material such as the Simulated Liquid Leading™ material sold by Plaid Enterprises located in Norcross, Ga. (see FIG. 8). A mold 86 for forming a flexible strip or imitation lead strip 87 is shown in FIGS. 7 and 8. Mold 86 is made from any suitable non-stick material such as plastic and preferably polyethylene. The mold 86 has the shape of a strip and includes an upper planar surface 88 provided with a plurality of longitudinally-extending grooves 91 transversely spaced-apart across the surface 88. Each of grooves 91 is formed from an arcuate surface which, as shown most clearly in FIG. 8, is semi-circular in shape. One of the grooves 91 in FIGS. 7 and 8 is shown without a strip 87 therein.

In operation and use, the liquid plastic 84 is disposed in grooves 91. In a preferred approach, a straight edge is passed over upper surface 88 so as to ensure that grooves 91 are completely filled and that flexible strips 87 forming therein have a planar bottom surface 92. Grooves 91 serve to provide imitation lead strips 87 with an upper surface 93 which is semi-circular when viewed in cross section. It should be appreciated that grooves 91 can be shaped so as to provide imitation lead strips 87 with an upper surface having any desired shape. Optional additional layers of liquid plastic 84 can be disposed within grooves 91 in a manner similar to that described above should the previous deposition(s) of liquid plastic shrink during curing.

Once an imitation lead strip 87 has been so formed to the desired shape within its groove 91, the strip 87 is peeled from mold 86 and deposited onto a surface such as surface 13 of glass 12. The bottom planar surface 92 of strip 87 is preferably placed against the surface of the glass so as to provide sufficient contact area between the imitation lead strip and the glass. It is preferable that imitation lead strip 87 be applied to the glass surface after the plastic material 84 has hardened but not fully cured so that the remaining tackiness of the plastic material adheres the strip 87 to the glass. As is well established in the art, further curing of the imitation lead strip 87 results in an adhesion force between the imitation leaded strip and the glass. Imitation solder 37 can optionally be provided at the intersection of imitation strip 87. In addition, a painted layer 43 can be provided on the segments of glass surface bordered by the imitation lead strips 87.

Figure 9:
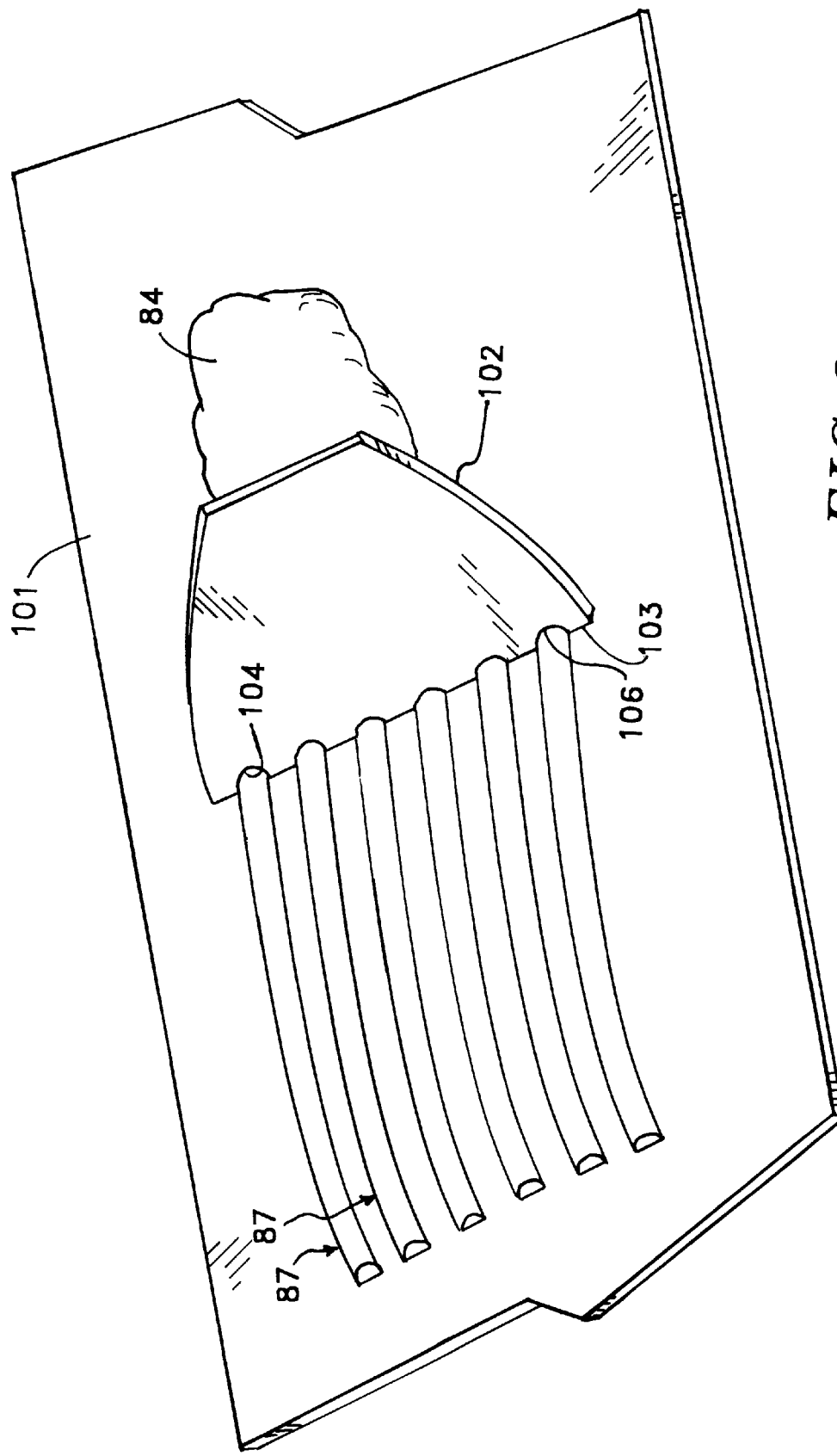
FIG. 9 is an isometric view of a tool and process for creating another embodiment of the imitation leading strips of the present invention.

Other methods can be provided for forming imitation lead strips 87. For example, liquid plastic 84 can be disposed on a suitable surface such as planar surface 101 in a process shown in FIG. 9. Thereafter, instrument 102 having a straight edge 103 provided with a plurality of cutouts 104 spaced across straight edge 103 is passed over liquid plastic 84. Cutouts 104 are each formed from a surface 106, shown in FIG. 9 as being semi-circular in shape, for providing imitation lead strip 87 with a upper surface 93 of a desired shape. Planar surface 101 provides imitation lead strips 87 with its planar bottom surface 93. Guide means (not shown) can be provided for guiding instrument 102 over surface 101 in a desired path. Examples of such guide means include spaced apart strips or other upstanding members provided on surface 101 or a groove provided in surface 101 which has the width of straight edge 103.

After strips 87 have hardened on planar surface 101, the strips can be peeled from the surface 101 and placed upon a surface such as surface 13 of glass sheet 12 to form an aesthetic structure as described above with respect to the imitation lead strips 87 formed by molding 86.

In view of the foregoing, it can be seen that a new and improved strip has been provided for application to a surface to create the appearance of a leaded framework. The strip is inexpensive and is formed from a non-metallic material. The strip is preformed prior to application to the surface and can be operated upon immediately following application to the surface. The strip can be removed from the surface and replaced onto the surface during a convenient time period after initial placement.

What is claimed is:

1. An aesthetic structure comprising a sheet of material having a smooth surface, a plurality of flexible strips each formed from a layer of elastomeric polymer having a planar surface and a layer of adhesive material adhered to the planar surface of the layer of elastomeric polymer for securing the strip to the smooth surface of the sheet of material, the strips being disposed on the smooth surface of the sheet of material in spaced-apart positions to delineate the smooth surface of the sheet of material into discrete regions for forming an aesthetic design on the sheet of material.

2. An aesthetic structure as in claim 1 further comprising a paint applied to the discrete regions of the sheet of material to create the appearance of a stained glass structure.

3. An aesthetic structure as in claim 2 wherein the paint is semi-transparent.

4. An aesthetic structure as in claim 1 wherein the adhesive material is a solvent based acrylic adhesive.

5. An aesthetic structure as in claim 1 wherein the adhesive material is an emulsion based acrylic adhesive.

6. An aesthetic structure as in claim 1 wherein the strips meet at intersections, a hardenable material appliable in a liquid form disposed on the intersections for creating the appearance of a solder at each of the intersections.

7. An aesthetic structure as in claim 6 wherein the hardenable material is plastic.

8. An aesthetic structure as in claim 6 wherein the hardenable material is the Simulated Liquid Leading™ material sold by Plaid Enterprises.

9. An aesthetic structure as in claim 1 wherein the sheet of material is a pane of glass.

10. An aesthetic structure comprising a sheet of material having a smooth surface, a plurality of flexible strips each formed from a layer of foamed plastic having a planar surface and a layer of adhesive material adhered to the planar surface of the layer of foamed plastic for securing the strip to the smooth surface of the sheet of material, the strips being disposed on the smooth surface of the sheet of material in spaced-apart positions to delineate the smooth surface of the sheet of material into discrete regions for forming an aesthetic design on the sheet of material.

11. An aesthetic structure as in claim 10 further comprising a paint applied to the discrete regions of the sheet of material to create the appearance of a stained glass structure.

12. An aesthetic structure as in claim 11 wherein the paint is semi-transparent.

13. An aesthetic structure as in claim 10 wherein the adhesive material is a solvent based acrylic adhesive.

14. An aesthetic structure as in claim 10 wherein the adhesive material is an emulsion based acrylic adhesive.

15. An aesthetic structure as in claim 10 wherein the strips meet at intersections, a hardenable material appliable in a liquid form disposed on the intersections for creating the appearance of a solder at each of the intersections.

16. An aesthetic structure as in claim 15 wherein the hardenable material is plastic.

17. An aesthetic structure as in claim 16 wherein the hardenable material is the Simulated Liquid Leading™ material sold by Plaid Enterprises.

18. An aesthetic structure as in claim 10 wherein the sheet of material is a pane of glass.

19. An aesthetic structure comprising a sheet of material having a smooth surface, a plurality of strips, each strip formed from a layer of plastic material having a width and a bottom surface and a layer of adhesive material adhered to the bottom surface and extending across the entire width of the layer of plastic material whereby the strips are formed on a backing sheet having a layer of the adhesive material disposed thereon and a layer of the plastic material disposed atop the layer of the adhesive material and a plurality of grooves provided in the layer of the plastic material and the layer of the adhesive material to permit separation of the strips from each other, the plastic material selected from the group consisting of elastomeric polymers and foamed plastics, the strips being disposed on the smooth surface of the sheet of material in spaced-apart positions with spaces therebetween to delineate the smooth surface of the sheet of material into discrete regions for forming from the strips and the spaces an aesthetic design on the sheet of material.

20. An aesthetic structure as in claim 19 further comprising a paint applied to the discrete regions of the sheet of material to create the appearance of a stained glass structure.

21. An aesthetic structure as in claim 20 wherein the paint is semi-transparent.

22. An aesthetic structure as in claim 19 wherein the adhesive material is a solvent based acrylic adhesive.

23. An aesthetic structure as in claim 19 wherein the adhesive material is an emulsion based acrylic adhesive.

24. An aesthetic structure as in claim 19 wherein the strips meet at intersections when disposed on the smooth surface of the sheet of material, a hardenable material appliable in a liquid form disposed on the intersections for creating the appearance of a solder at each of the intersections.

25. An aesthetic structure as in claim 19 wherein the sheet of material is a pane of glass.

* * * * *